United States Patent
Ramaswamy

(10) Patent No.: US 9,537,664 B2
(45) Date of Patent: Jan. 3, 2017

(54) NETWORK BASED REMOTE POWER MANAGEMENT SYSTEM AND METHOD FOR SELECTIVELY POWERING ON A HARDWARE SUBSYSTEMS AND DETERMINING ENERGY USAGE BILLING INFORMATION OF A GATEWAY DEVICE BASED ON DETERMINATION OF SOURCE OF RECEIVED INPUT SIGNAL

(75) Inventor: Kumar Ramaswamy, Princeton, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 612 days.

(21) Appl. No.: 13/513,974

(22) PCT Filed: Dec. 9, 2009

(86) PCT No.: PCT/US2009/006462
§ 371 (c)(1),
(2), (4) Date: Jun. 5, 2012

(87) PCT Pub. No.: WO2011/071471
PCT Pub. Date: Jun. 16, 2011

(65) Prior Publication Data
US 2012/0239947 A1  Sep. 20, 2012

(51) Int. Cl.
G06F 1/00 (2006.01)
H04L 12/12 (2006.01)
G06F 1/32 (2006.01)
H04L 12/28 (2006.01)
H04N 21/443 (2011.01)
H04N 21/61 (2011.01)
(Continued)

(52) U.S. Cl.
CPC ............ *H04L 12/12* (2013.01); *G06F 1/32* (2013.01); *G06F 1/3209* (2013.01); *H04L 12/2801* (2013.01); *H04L 12/2818* (2013.01); *H04N 21/443* (2013.01); *H04N 21/4436* (2013.01); *H04N 21/6118* (2013.01); *H04N 21/6405* (2013.01); *H04L 12/185* (2013.01); *H04L 41/18* (2013.01); *Y02B 60/34* (2013.01)

(58) Field of Classification Search
CPC ............ G06F 1/32; G06F 9/541; H04L 12/12; H04L 12/28; H04L 67/04; H04L 67/327; H04N 21/443
See application file for complete search history.

(56) References Cited

U.S. PATENT DOCUMENTS 6,593,975 B1 *  7/2003  Oh .............................. 348/730
6,732,141 B2 *  5/2004  Ellis ....................... G06F 9/5072
                                                    709/201
(Continued)

FOREIGN PATENT DOCUMENTS

CN           1947443      4/2007
CN         101170775      4/2008
(Continued)

Primary Examiner — Thomas Lee
Assistant Examiner — Zhipeng Wang
(74) Attorney, Agent, or Firm — Brian J. Dorini; Catherine A. Cooper

(57) ABSTRACT

A method and device are described including receiving an input signal at a device, determining a source of the received input signal and selectively powering on portions of the device responsive to the determination.

13 Claims, 3 Drawing Sheets

(51) Int. Cl.
*H04N 21/6405* (2011.01)
*H04L 12/18* (2006.01)
*H04L 12/24* (2006.01)

(56) References Cited

U.S. PATENT DOCUMENTS

| | | | |
|---|---|---|---|
| 7,058,458 B2 | 6/2006 | Munezane | |
| 7,260,729 B2 | 8/2007 | Araki | |
| 7,593,979 B2 | 9/2009 | Seki et al. | |
| 7,735,113 B2 | 6/2010 | Koga | |
| 8,141,118 B2 | 3/2012 | Regan et al. | |
| 8,238,559 B2 * | 8/2012 | Casey | H04L 63/10 380/279 |
| 2002/0065929 A1 | 5/2002 | Kamentsky et al. | |
| 2003/0028653 A1 * | 2/2003 | New et al. | 709/229 |
| 2004/0052347 A1 | 3/2004 | Kimura et al. | |
| 2005/0076374 A1 * | 4/2005 | Nakamura | G06F 1/3203 725/81 |
| 2005/0169240 A1 * | 8/2005 | Bal | G06F 9/541 370/351 |
| 2005/0276237 A1 | 12/2005 | Segal et al. | |
| 2006/0092152 A1 * | 5/2006 | Jang et al. | 345/211 |
| 2007/0094691 A1 * | 4/2007 | Gazdzinski | 725/62 |
| 2007/0129076 A1 | 6/2007 | Cho et al. | |
| 2007/0130280 A1 * | 6/2007 | Park | H04L 12/10 709/208 |
| 2007/0283179 A1 | 12/2007 | Burnett et al. | |
| 2008/0313689 A1 | 12/2008 | Suzuki et al. | |
| 2009/0063878 A1 | 3/2009 | Schmidt et al. | |
| 2009/0243869 A1 * | 10/2009 | Sanderford, Jr. | G01D 4/002 340/657 |
| 2009/0248854 A1 * | 10/2009 | Conway | G06F 1/3203 709/224 |
| 2009/0252165 A1 | 10/2009 | Zhang et al. | |
| 2009/0279563 A1 * | 11/2009 | Sampath | H04W 52/322 370/432 |
| 2009/0293090 A1 * | 11/2009 | Quigley | H04N 7/17318 725/62 |
| 2010/0228971 A1 * | 9/2010 | Carles | H04L 9/3271 713/163 |
| 2010/0248742 A1 * | 9/2010 | Song et al. | 455/456.1 |
| 2011/0194471 A1 | 8/2011 | Kim et al. | |

FOREIGN PATENT DOCUMENTS

| | | |
|---|---|---|
| CN | 101222388 | 7/2008 |
| EP | 1376938 A1 | 1/2004 |
| EP | 1381187 A1 | 1/2004 |
| JP | 11196405 | 7/1999 |
| JP | 2003009035 | 1/2003 |
| JP | 2004032546 | 1/2004 |
| JP | 2005062955 | 3/2005 |
| JP | 2005073142 | 3/2005 |
| JP | 2005176112 | 6/2005 |
| JP | 2006042326 | 2/2006 |
| JP | 2008098791 | 4/2008 |
| JP | 2009225353 | 10/2009 |
| KR | 20070059873 | 6/2007 |
| KR | 20090065152 | 6/2009 |
| WO | 0233853 A1 | 4/2002 |
| WO | WO2004091212 | 10/2004 |
| WO | 2009029684 A1 | 3/2009 |

* cited by examiner

NETWORK BASED REMOTE POWER MANAGEMENT SYSTEM AND METHOD FOR SELECTIVELY POWERING ON A HARDWARE SUBSYSTEMS AND DETERMINING ENERGY USAGE BILLING INFORMATION OF A GATEWAY DEVICE BASED ON DETERMINATION OF SOURCE OF RECEIVED INPUT SIGNAL

This application claims the benefit, under 35 U.S.C. §365 of International Application PCT/US09/06462, filed 9 Dec. 2009, which was published in accordance with PCT Article 21(2) on 16 Jun. 2011 in English

FIELD OF THE INVENTION

The present invention relates to power management of customer premises equipment and end devices.

BACKGROUND OF THE INVENTION

In multicast/broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

Power management is an important requirement in customer premises equipment (CPE) and end devices. Today, this can be managed with tools in the CPE. However, such management in the home may conflict directly with the operator's desire to download services to the CPE at their convenience in order to optimize the infrastructure bandwidth usage across all users.

A common ecodesign principle advocated today is to embed power management functions in the Customer Premises Equipment (CPE) and/or end (client) devices. Such functionality allows the CPE equipment to be selectively turned off if there is no activity detected for a certain period of time. When a user requests a program (for example, from a remote control or a timed recording event), the CPE can be turned back on. In order for this to work, a small circuit is kept awake all the time. This circuit detects user inputs or a timed event and is capable of waking up the entire CPE to enable complete functionality.

The disadvantage of this approach is two-fold. First, operators push programs to users taking advantage of the available storage on the CPE. This can be a predictive push or a scheduled push on a customer request in a particular time window. The operator can manage a scarce resource i.e., the last mile bandwidth to the home, more effectively by pre-caching content in storage available at and/or on the CPE. In current systems, there does not exist a mechanism to turn the CPE on for network based events. Second, increasingly, there are CPE devices that act as home servers. Since CPEs (end devices) have network accessible local storage, they can be used to serve up content to other devices in the home. For this, CPE devices acting as home servers need to be awakened when local area network requests are directed towards the CPE from other end devices in the home.

SUMMARY OF THE INVENTION

The present invention moves the CPE power management function into the network under the control of the network operator. The present invention is applicable particularly to networks that have a separate two-way channel apart from the main multicast channel.

The present invention provides a mechanism to manage power consumption in client devices by managing the function from the network. That is, the present invention is directed to networks that have a broadcast link and an additional two-way link (e.g., cable systems). As used herein CPE includes but is not limited to processors, computers, laptops, cable modems, cable set top boxes (STBs), satellite receivers and personal video recorders (PVRs).

A method and device are described including receiving an input signal at a device, determining a source of the received input signal and selectively powering on portions of the device responsive to the determination.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
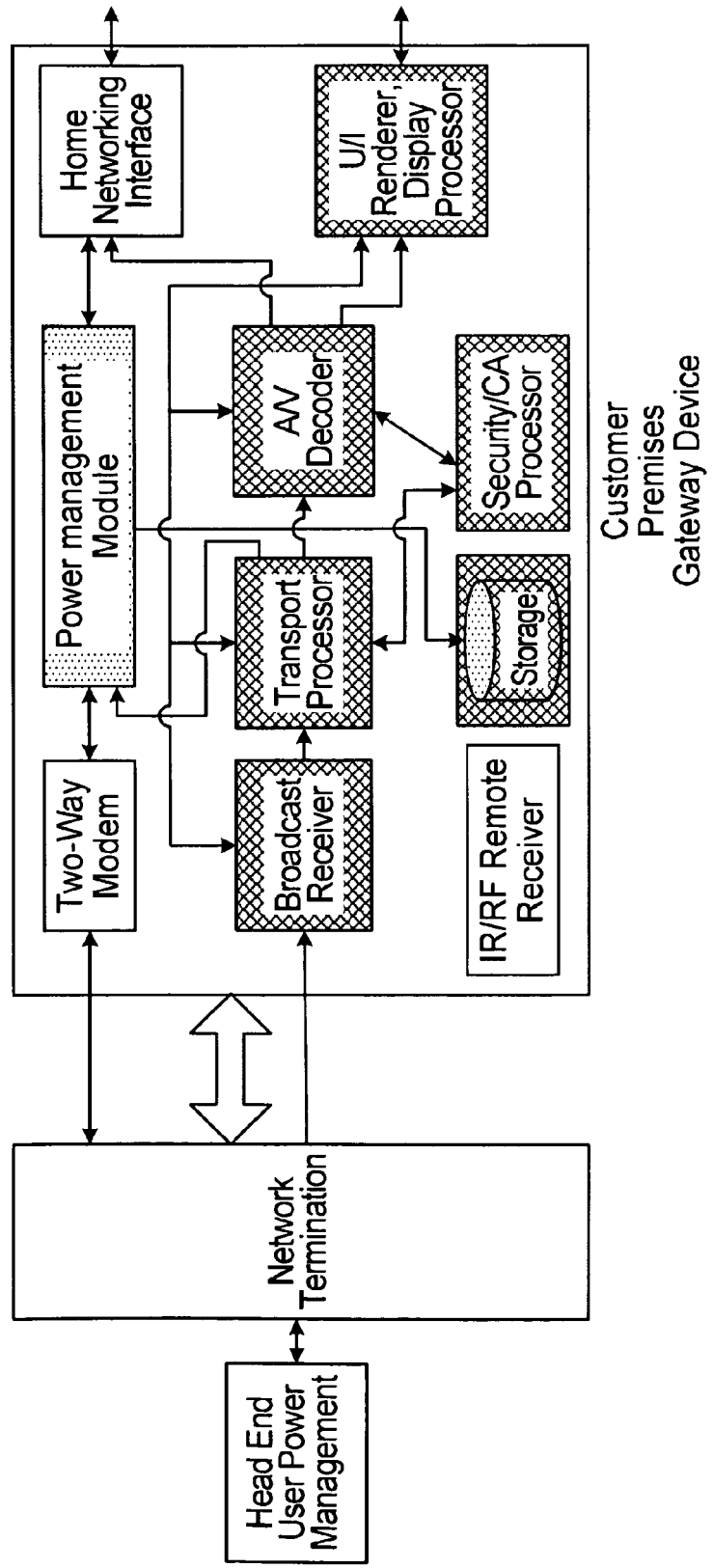
FIG. 1 is a block diagram of an end-to-end multicast broadband system in accordance with the principles of the present invention.

The present invention solves the first issue giving the operator flexibility to manage when the receiving device is to be turned on or off when the user is not actively using the applications provided by the device. FIG. 1 is a block diagram of an exemplary embodiment of an end-to-end multicast broadband system. The block diagram is representative of a typical cable system. The Customer Premises gateway device has both a standard multicast interface for multicast program reception and a two-way modem interface with the network. The two-way modem is typically a Docsis modem. This modem could be used for diagnostic purposes, interactivity applications or it can be used as an IP connection back into the network for a broad range of IP based applications.

In a normal application mode, all the subsystems would be turned on and function normally. In a low power (either user initiated, timed or network managed) or sleep mode, the subsystem blocks in hatch (multicast receiver, transport processor, audio/visual (A/V) decoder, user interface (U/I) renderer/display processor, storage, security/conditional access (CA) processor) would all be turned off. The rest of the subsystems (power management module, home networking interface and IF/RF remote receiver) have to be kept alive or turned on (in the power on state). It may be necessary for the home networking interface to be on (powered on) all the time since there may be requests for content in storage from a networked device in the home. The two-way modem is also maintained in the powered on state for continued diagnostics etc. and for network information updates.

There are several scenarios for bringing the system back to normal functional mode which could imply turning on different subsystems:

1. User input: The user uses either an IR or RF remote to wake up the system. This event causes all the hatched blocks to power on (up) and be available for processing again.
2. The local area network makes a request to retrieve information from a personal video recorder (PVR). If compressed video information is to be retrieved and redistributed in the home from the storage device, parts of the system will have to be awakened. These may include the storage subsystem, the security/CA processor, and the transport processor.
3. The network wants to push content into several CPEs. The network may choose to do this in two ways:
   a. Multicast mode: In this case, the network has to send advance notice to the CPE through the two-way modem to wake the CPE up for the CPE to tune in to receive the content on the multicast channel. In this case, the multicast receiver, the transport processor, the storage subsystem and possibly the security/CA processor have to be awakened in order to receive and store the content in the PVR. The content may not be decoded at this time and may be stored in compressed format.
   b. Network mode: In this case, the content is sent in either unicast or possibly multicast through the two-way modem (and the associated IP infrastructure). In this case, only the storage subsystem, the transport processor and the security/CA processor may have to be turned (powered) on.
4. In typical multicast systems, program guides are sent in a data carousel in a periodic manner. This allows the guide tables to be updated in the background even if the receiver is not in use. If one were to turn off the multicast receiver in a power savings mode, then the guide tables will be outdated when the user turns the system back on. One way to solve this problem is to use the IP Channel in the two-way modem (which is an always-on channel) to update the guide tables. This can either be sent in unicast (since the network is made aware of the state of CPE at all times before it enters that state so the network is aware that the CPE is in sleep mode with its multicast receiver turned off) or by requesting the CPE to join the appropriate multicast group.
5. In general, it is probably more efficient to have all non-real time information (like guide information etc.) sent in the manner described above in the cable infrastructure.
6. Since the network is deciding when to turn on and turn off the CPE (in the case when the operator is pushing content into the CPE), there may be a need to establish credits when the turn-on is network initiated to compensate for the increased power usage in the CPE. In the case when it is content requested by the user and the operator is simply scheduling the content to be delivered in a time-staggered manner, then the user should be responsible for the increased energy usage in the CPE. However, when it is strictly for the benefit and convenience of the network operator (such as when the network operator is using the CPE as a peer or edge server to distribute content to other nearby peers (CPEs) then a credit should be applied to the user.

Figure 2A:
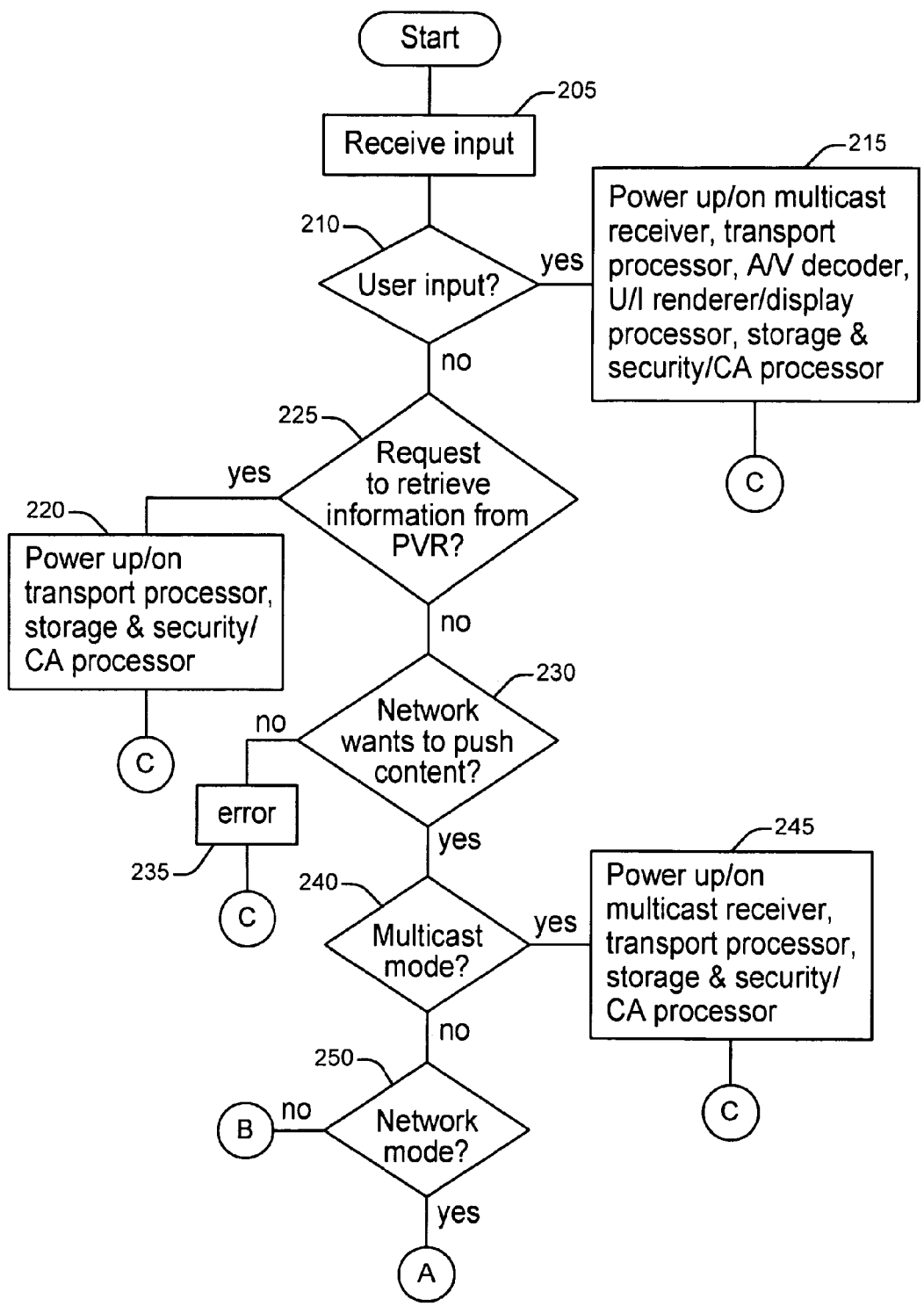
FIGS. 2A and 2B together are a flowchart of the operation of an exemplary embodiment of the present invention from the perspective of the CPE.
Figure 2B:
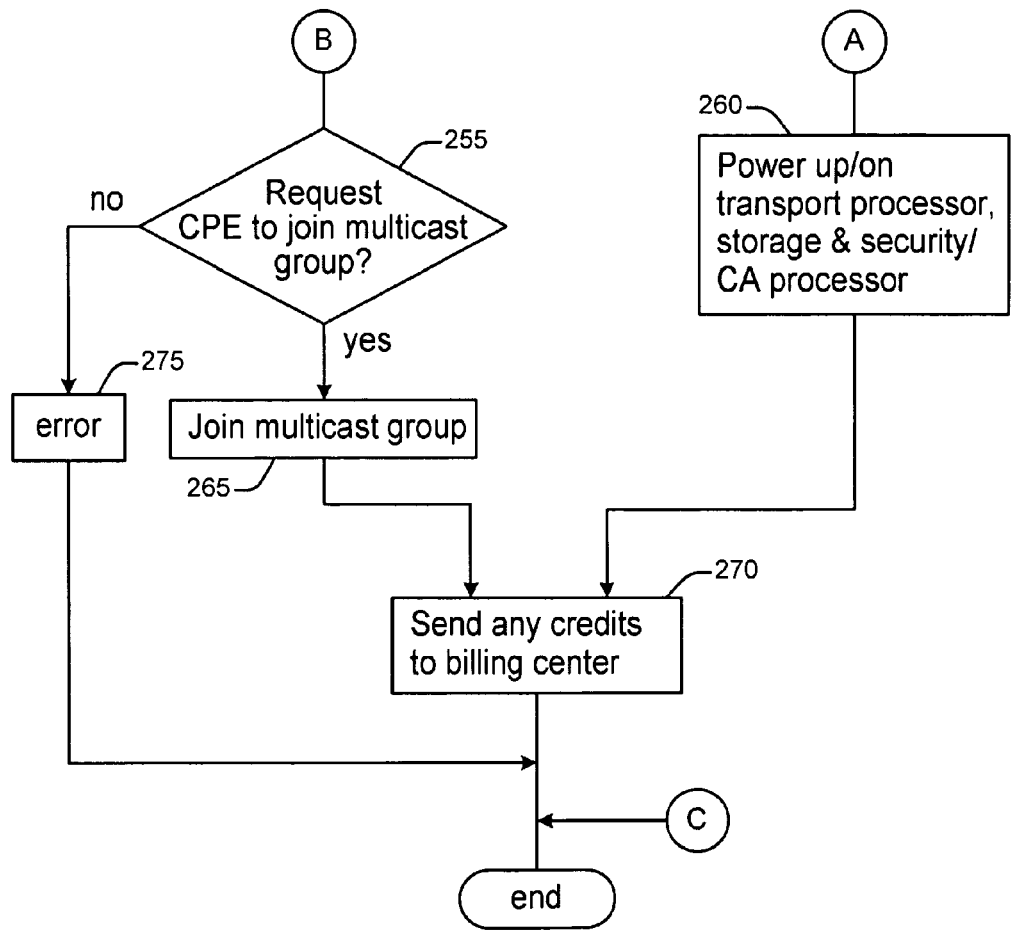

FIGS. 2A and 2B together are a flowchart of an exemplary embodiment of the present invention from the perspective of the CPE. At 205 the CPE receives input. At 210 the CPE performs a test to determine if the input was from a user from, for example, a remote control device (IR or RF). If the received input came form the user then at 215, the CPE powers up (on) its multicast receiver, its transport processor, it's A/V decoder, its U/I renderer/display processor, its storage and its security/CA processor. Processing then continues until another input is received. If the received input did not come from a user, then at 225 a test is performed to determine if the received input was a request to retrieve information from the PVR. Inputs could be from a secondary STB requesting content that was stored in the primary gateway/STB i.e. the primary STB/gateway acts as a shared PVR in the home. The device that is being managed for power is the primary STB or gateway. If the received input was a request to retrieve information from the PVR then at 220 the CPE powers on (up) its transport processor, its storage and its security/CA processor. If the received input was not a request to retrieve information from the PVR then at 230 a test is performed to determine if the network wants to push content. As used herein content includes, but is not limited to, audio, video, data, multimedia or any combination thereof or any other form content may take. If the network does not want to push content then at 235 an error has occurred and processing ends until additional input is received. Error processing may occur at this point such as posting or displaying an error message to the user or to the network. If the network wants to push content then at 240 a test is performed to determine if the CPE is in multicast mode. If the CPE is in multicast mode then at 245 the CPE powers on (up) its multicast receiver, its transport processor, its storage and its security/CA processor. Processing then ends until more input is received. If the CPE is not in multicast mode then at 250 a test is performed to determine if the CPE is in network mode. If the CPE is in network mode then at 260 the CPE powers on (up) its transport processor, its storage and its security/CA processor. At 270 the CPE sends any credit information to the billing center and processing ends until more input is received. If the CPE is not in network mode then at 255 a test is performed to determine if the received input is a request for the CPE to join a multicast group. If the received input is a request to join a multicast group, then at 265 the CPE joins the specified multicast group. Processing then proceeds to 270. If the received input is not a request to join a multicast group then at 275 an error has occurred and processing ends until additional input is received. Error processing may occur at this point such as posting or displaying an error message to the user or to the network. In each case where all or part of the CPE is powered on (up) additional steps (acts) may be performed such as downloading content to the CPE by the network before processing ends. Also it should be noted that storage is a generic term and intended to include any and all forms of storage, including all forms of memory, tape, discs, optical discs, etc.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
    receiving an input signal at a gateway device;
    determining a source of said received input signal, wherein said source of said received input signal is one of a user input and a network delivered content;
    determining a mode if said source of said received input signal is said network delivered content, wherein said mode is one of a multicast mode and a network mode;
    selectively powering on hardware subsystems of said gateway device responsive to said source determination and said mode determination; and
    determining and transmitting credit information for energy usage to a billing center responsive to said mode determination.

2. The method according to claim 1, further comprising powering on hardware subsystems including at least one of a multicast receiver, a transport processor, an audio/video decoder, a user interface display processor, storage and a security processor, said security processor including conditional access processing responsive to said determination.

3. The method according to claim 1, further comprising powering on hardware subsystems including at least one of a transport processor, storage and a security processor, said security processor including conditional access processing responsive to said determination.

4. The method according to claim 1, further comprising powering on hardware subsystems including at least one of a multicast receiver, a transport processor, storage and a security processor, said security processor including conditional access processing responsive to said mode determination.

5. The method according to claim 1, further comprising using a two way channel in a digital cable infrastructure.

6. The method according to claim 1, further comprising:
    determining if said received input signal includes a request to join a multicast group; and
    joining said multicast group specified in said received input signal upon determining said received input signal includes a request to join a multicast group.

7. A gateway device comprising:
    a modem for receiving an input signal;
    a power management processor for determining a source of said received input signal, wherein said source of said received input signal is one of a user input and a network delivered content, determining a mode if said source of said received input signal is said network delivered content, wherein said mode is one of a multicast mode and a network mode, selectively powering on hardware subsystems of said device responsive to said source determination and said mode determination; and determining credit information for energy usage; wherein said two way modem transmits the credit information for energy usage to a billing center responsive to said mode determination.

8. The device according to claim 7, wherein the power management processor powers on hardware subsystems including at least one of a multicast receiver, a transport processor, an audio/video decoder, a user interface display processor, storage and a security processor, said security processor including conditional access processing responsive to determining the source of said received input signal.

9. The device according to claim 7, wherein the power management processor powers on hardware subsystems including at least one of a transport processor, storage and a security processor, said security processor including conditional access processing responsive to determining the mode of said received input signal.

10. The device according to claim 7, wherein the power management processor powers on hardware subsystems including at least one of a multicast receiver, a transport processor, storage and a security processor, said security processor including conditional access processing responsive to determining the mode of said received input signal.

11. The device according to claim 7, further comprising using a two way channel in a digital cable infrastructure.

12. The device according to claim 7, wherein said power management processor further
    determines if said received input signal includes a request to join a multicast group; and
    controls said device to join said multicast group specified in said received input signal if said received input signal includes a request to join a multicast group.

13. The device according to claim 7, wherein said device is customer premises gateway equipment.

* * * * *